Figure 1:
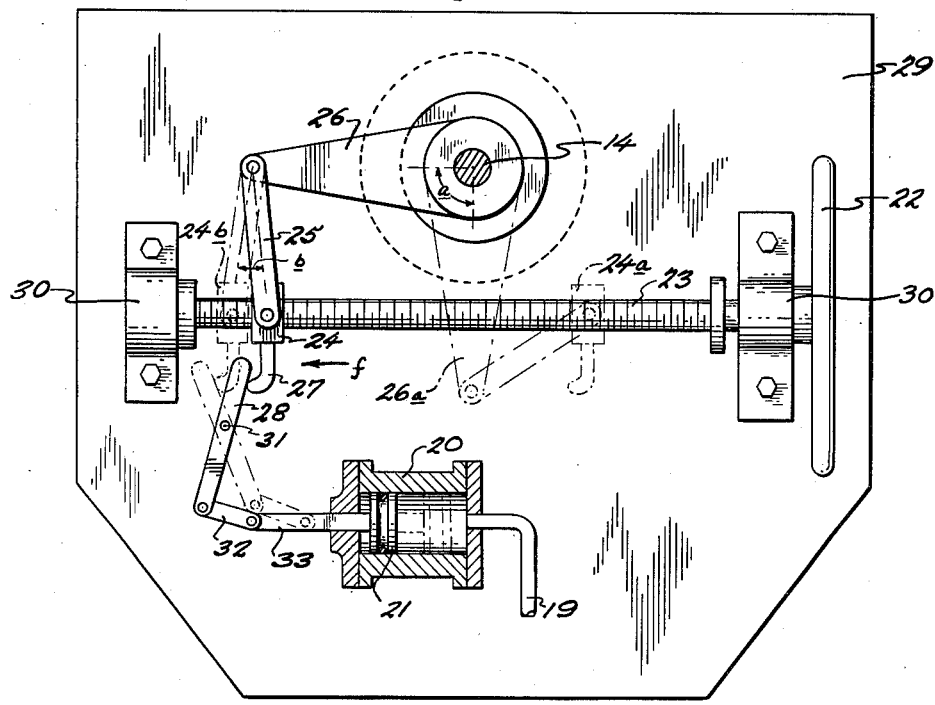

May 15, 1962  M. C. E. HENRION  3,034,760
FLUIDTIGHT CLOSING MEANS FOR THROTTLE VALVES
HAVING A CONTINUOUS OUTLINE
Filed Nov. 9, 1959

INVENTOR.
MARIE CHARLES EMILE HENRION
BY
ATTORNEY.

United States Patent Office 3,034,760
Patented May 15, 1962

3,034,760
FLUIDTIGHT CLOSING MEANS FOR THROTTLE VALVES HAVING A CONTINUOUS OUTLINE
Marie Charles Emile Henrion, 11 Rue Hermite, Nancy, France
Filed Nov. 9, 1959, Ser. No. 851,650
Claims priority, application France Dec. 3, 1958
6 Claims. (Cl. 251—173)

This invention relates to improvements in throttle valves of the type in which the continuous periphery of the valve engages the inner wall of the associated valve body while the spindle carrying the valve does not pass through the valve body in the area of the latter engaged by the valve in the closed position of the latter.

In such valves, the passage provided for the fluid is closed perfectly through engagement of the periphery of the valve against the inner wall surface of said valve body only if the surfaces in contact with each other are energetically clamped together. Accordingly, it is the object of the invention to provide means, in valves of the described character, for effecting tight sealing engagement, in the closed position of the valve between the periphery of the valve and the inner wall surface of the valve body.

To obtain this result in accordance with my invention, a resilient ring or ferrule is set inside the body or casing of the valve with the inner surface of the resilient ring being flush with the inner wall surface of the casing and beig devoid of any projection capable of hindering the rotary movement of the throttle valve; said resilient ring or ferrule further is separated from the body of the valve over a section of its length by an annular recess filled with a fluid such as oil, on which a jack or piston movable in a cylinder is adapted to act so as to produce in said recess a certain pressure which effects a slight inward bulging deformation of the ferrule along the entire periphery of the throttle valve, and thereby achieves the desired tight sealing engagement with the latter.

Further, in accordance with the invention, the valve is moved between its open and closed positions in response to movement of a nut along a rotatable control screw, and the connection between the valve and the movable nut permits further movement of the latter along the control screw in the direction for closing the valve after the latter has attained its closed position, with such further movement of the nut being employed to operate the jack for pressurizing the fluid in the recess.

In a preferred embodiment of the invention the nut is connected to the valve through a radial arm connected to the valve spindle and moving through approximately 90 degrees in opening the valve from a position substantially parallel to the control screw in the closed position of the valve, and a connecting link between the arm and nut which undergoes substantial angular displacement during the mentioned further movement of the nut on the control screw while the corresponding angular displacement of the arm and valve spindle is insignificant.

Figure 2:
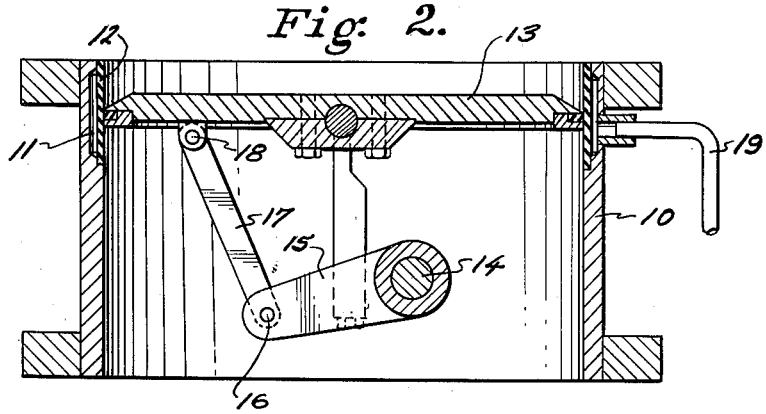

The above, and other objects, features and advantages of the invention, will be apparent in the following detailed description thereof which is to be read in connection with the accompanying drawing, wherein:

FIG. 1 is a side elevational view of the mechanism for operating a throttle valve in accordance with the invention; and FIG. 2 is an axial section of the throttle valve in its closed position.

Referring to the drawing in detail, and initially to FIG. 2 thereof, it will be seen that a throttle valve embodying the present invention includes a generally cylindrical casing 10 which may be flanged at its opposite ends and which has an annular, radially inward opening recess 11 formed in its inner surface. A resilient ring or ferrule 12 extends across recess 11 and has its inner surface flush with the remainder of the inner wall surface of casing 10.

The usual valve element 13 is swingably mounted in casing 10 to move between the illustrated closed position, in which it extends across the casing and has its periphery in engagement with resilient ring or ferrule 12, and an open position (not shown), in which valve element 13 is swung approximately 90 degrees from the closed position and thus extends parallel to the direction of flow of fluid through casing 10.

The movements of valve element 13 between its closed and opened positions are effected by turning of a valve actuating spindle 14 extending into casing 10 parallel to the swinging axis of the valve element and spaced from the latter. A radial arm 15 fixed to spindle 14 has its outer end pivotally connected, as at 16, to a link 17 which is, in turn, pivotally connected at 18 to valve element 13 at a location on the latter spaced from the swinging axis thereof. Thus, turning of spindle 14 through approximately 90 degrees in the counter-clockwise direction, as viewed in FIG. 2, causes swinging movement of valve element 13 from the illustrated closed position to its full open position.

In the throttle valve embodying this invention, fluid, for example, oil, is contained in recess 11 and is subjected to pressure through a conduit 19 opening into the recess following movement of valve element 13 to its closed position so that the fluid under pressure in recess 11 then acts against resilient ring or ferrule 12 to elastically deform or bulge the latter radially inward against the periphery of valve element 13 and thereby obtain tight sealing engagement with the latter.

The pressurizing of the fluid in recess 11 is effected by a jack or cylinder 20 (FIG. 1) connected at one end to conduit 19 and having a piston 21 movable in the cylinder to increase the pressure in recess 11 in response to movement of the piston toward said one end of cylinder 20 and to decrease the pressure in the recess upon return movement of the piston under the tendency of ring 12 to elastically return to its original shape.

Referring to FIG. 1, it will be seen that, in accordance with the invention, opening and closing of valve element 13 is effected by manual rotation of a handwheel 22 rigid with a threaded rod 23 on which is screwed a nut 24 driving the actuating spindle 14 of the throttle valve through a connecting rod 25 and a crank 26 fixed on spindle 14. This same nut is provided with a lateral extension 27 adapted when moving with the nut to push forwardly one of the ends of a lever 28. The latter in its turn acts through its other end on the piston 21 for compressing the oil in the jack 20, said arrangement leading to a substantial shifting of said piston and consequently to a high compression of the oil inside the jack for a comparatively small progression of the nut over the threaded rod.

The above generally described actuating mechanism is mounted on a plate 29 disposed at one side of the valve casing 10 and carrying bearings 30 in which threaded rod 23 is journalled so as to extend generally parallel to crank or arm 26 when valve element 13 is in its closed position. The plate 29 further carries the cylinder 20 and a pivot 31 on which lever 28 is pivotally mounted intermediate its ends. Pivot 31 is located so that one end of lever 28 projects into the path of travel of extension 27 of nut 24 on threaded rod 23. The lever 28 controls the piston 21 of the cylinder 20 filled with oil, through the agency of a link 32 the ends of which are pivotally secured respectively to the lever 28 and to a piston rod 33 extending from the piston 21.

When the nut 24 moves towards its operative position shown at 24b in response to rotation of the hand-wheel 22 and of the threaded rod 23, the piston 21 urged forwardly by the lever 28 and the link 32 compresses oil in cylinder 20 and drives said oil through the pipe or conduit 19 into the recess 11 provided in the valve body 10 at the outside of ferrule 12 so as to deform the ferrule and thereby urge said ferrule energetically against the periphery of the closed valve element 13.

When the throttle valve is to be opened, handwheel 22 is rotated until the nut is in its inoperative position 24a shown in dot-and-dash lines. When it is desired to close the throttle valve, the hand-wheel is rotated in the opposite direction so as to shift the nut along the threaded rod 23 and through the agency of the connecting rod 25 and of the crank 26, this leads to a rotation of the throttle valve spindle 14. The valve element 13 is connected to spindle 14, as previously described herein, so that it engages the inner surface of the ferrule 12 within the valve body when the crank 26 has moved through an angle $a$ of about 90° starting from its inoperative position 26a shown in dot-and-dash lines. From this moment onwards, it is possible to continue rotating the hand-wheel so that connecting rod 25 moves further through an angle $b$ of say 5 to 10° whereby it is brought into the position 25b, the nut entering then the above-mentioned position 24b.

During this further rotation of the hand-wheel, the nut 24 continues to move in the direction of the arrow $f$, so that the projection 27 acts on the lever 28 which pushes the piston 21 inside the cylinder 20 and the oil is delivered under pressure through the pipe 19 so as to act on the ferrule 12 as disclosed hereinabove.

Said operation is possible by reason of the clearances and positional relationship existing between the different parts of the arrangement considered which ensure that when the throttle valve element 13 has entered its closed position after moving through the angle of 90°, the throttle valve element remains substantially stationary during the further rotation of handwheel 22 for effecting angular shifting of the crank 26 through 5 to 10°. Consequently, the oil under pressure deforms the ferrule and urges it energetically against the throttle valve element so as to ensure a fluidtight closure of the latter.

It should be remarked that since the rod 23 is not shifted in the direction of its longitudinal axis, the arrangement is particularly suitable for remote mechanical control, the handwheel 22 being replaced in such a case by a transmission pulley for instance.

It goes without saying that the pressure exerted against the resilient ferrule by the fluid compressing piston is stronger than the pressure exerted upon the same ferrule by the fluid to be controlled by the butterfly valve element in the interior of the valve body or casing, this result being easily obtained as a consequence of the very small diameter of the piston 21.

What I claim is:

1. A valve mechanism comprising a casing, a valve element movable in said casing between opened and closed positions, resilient fluid pressure operated means forming a portion of the inner surface of said casing and extending along the periphery of said valve element in said closed position of the latter, said resilient means being operative, when acted upon by fluid under pressure, to effect sealing engagement with said periphery of the closed valve element, means for supplying fluid under pressure to said resilient fluid pressure operated means including a fluid containing cylinder connected to said resilient means and a piston movable in said cylinder to act on the fluid therein, means for actuating said valve element including a rotatable control screw, a nut movable axially along said screw in response to rotation of the latter and means connecting said nut to said valve element to move the latter to said closed position upon axial movement of said nut in one direction and permitting further movement of said nut in said one direction independent of movement of said valve element after the latter has attained said closed position, and means operative to displace said piston in said cylinder so as to supply fluid under pressure from the latter to said resilient means in response to said further movement of said nut.

2. A valve mechanism as in claim 1; wherein said means connecting said nut to said valve element includes a turnable spindle connected to said valve element and having a radial arm projecting therefrom and moving through approximately 90 degrees during movement of said valve element between said opened and closed positions, and a connecting link pivotally connected to said arm and nut, respectively, said arm extending generally parallel to said screw in said closed position of said valve element so that said further movement of the nut is accompanied by substantial angular displacement of said connecting link relative to said arm and insignificant angular displacement of aid arm and spindle.

3. A valve mechanism as in claim 2; wherein said means operative to displace said piston in said cylinder includes an extension on said nut, a rockable lever connected to said piston and projecting into the path of movement of said extension with said nut to be rocked by said extension during said further movement of the nut.

4. A valve mechanism as in claim 3; wherein said rockable lever is a two-armed lever having one arm connected to said piston and the other arm projecting into said path of movement of the extension, and wherein the effective length of said one arm is greater than the effective length of said other arm, so that said lever acts to effect a relative large displacement of said piston in response to a relatively small further movement of said nut.

5. A valve mechanism as in claim 1; wherein said means operative to displace said piston in said cylinder includes an extension on said nut, a rockable lever connected to said piston and projecting into the path of movement of said extension with said nut to be rocked by said extension during said further movement of the nut.

6. A valve mechanism as in claim 5; wherein said rockable lever is a two-armed lever having one arm connected to said piston and the other arm projecting into said path of movement of the extension, and wherein the effective length of said one arm is greater than the effective length of said other arm, so that said lever acts to effect a relative large displacement of said piston in response to a relatively small further movement of said nut.

References Cited in the file of this patent

UNITED STATES PATENTS

| | | |
|---|---|---|
| 1,014,775 | Rothchild | Jan. 16, 1912 |
| 1,643,753 | Slattery | Sept. 27, 1927 |
| 1,834,870 | Rogers | Dec. 1, 1931 |
| 2,081,842 | Sharp | May 25, 1937 |